United States Patent
Willson et al.

(10) Patent No.: US 7,900,431 B2
(45) Date of Patent: Mar. 8, 2011

(54) PROCESS AND PLANT FOR POWER GENERATION

(75) Inventors: Paul Willson, Manchester (GB); George Atkinson, Manchester (GB)

(73) Assignee: Parsons Brinckerhoff Limited (GB)

( * ) Notice: Subject to any disclaimer, the term of this patent is extended or adjusted under 35 U.S.C. 154(b) by 384 days.

(21) Appl. No.: 12/092,553

(22) PCT Filed: Oct. 20, 2006

(86) PCT No.: PCT/GB2006/050339
§ 371 (c)(1),
(2), (4) Date: Sep. 17, 2008

(87) PCT Pub. No.: WO2007/052070
PCT Pub. Date: May 10, 2007

(65) Prior Publication Data
US 2009/0025387 A1    Jan. 29, 2009

(30) Foreign Application Priority Data
Nov. 4, 2005  (GB) .................................. 0522591.7

(51) Int. Cl.
*F02C 6/00* (2006.01)
*F01K 7/34* (2006.01)
(52) U.S. Cl. ........................... 60/39.182; 60/653; 60/679
(58) Field of Classification Search ............... 60/39.182, 60/653, 677–679
See application file for complete search history.

(56) References Cited

U.S. PATENT DOCUMENTS

| | | | |
|---|---|---|---|
| 4,387,563 A | 6/1983 | Bell, III | |
| 4,664,594 A | 5/1987 | Mandet et al. | |
| 5,379,588 A * | 1/1995 | Tomlinson et al. | ........ 60/39.182 |

(Continued)

FOREIGN PATENT DOCUMENTS

DE    4126038    2/1993

(Continued)

OTHER PUBLICATIONS

International Preliminary Report on Patentability dated Jun. 11, 2009 for PCT/GB2007/050715.

(Continued)

*Primary Examiner* — Hoang M Nguyen
(74) *Attorney, Agent, or Firm* — Knobbe Martens Olson & Bear LLP (57) ABSTRACT

The present invention provides process and plant for power generation comprising: providing a steam generator; first, second and third steam turbines; a reheater; a gas turbine; and at least one heat exchanger; supplying a first stream comprising steam from the steam generator to the first steam turbine to generate power in the first steam turbine; recovering from the first steam turbine a recovered stream comprising steam and supplying at least a part of the recovered stream to the reheater; supplying a second stream comprising steam from the steam generator to a first zone of the heat exchanger and heating the second stream therein by supplying at least one hot exhaust gas from the gas turbine to the first zone of the heat exchanger; supplying the heated second stream to the second steam turbine to generate power therein; supplying a third stream comprising steam from the steam generator to the reheater to heat the recovered stream from the first steam turbine; recovering from the reheater a heated recovered stream from the first turbine; and supplying at least part of the heated recovered stream from the first turbine to the third steam turbine to generate power therein.

28 Claims, 9 Drawing Sheets

U.S. PATENT DOCUMENTS

| | | | |
|---|---|---|---|
| 5,428,950 A * | 7/1995 | Tomlinson et al. | 60/783 |
| 5,784,888 A * | 7/1998 | Termuehlen | 60/677 |
| 6,164,072 A | 12/2000 | Tsiklauri et al. | |
| 6,341,486 B2 * | 1/2002 | Hannemann et al. | 60/39.12 |
| 6,901,348 B2 * | 5/2005 | Smith et al. | 702/182 |
| 2001/0004829 A1 | 6/2001 | Liebig | |
| 2003/0037535 A1 | 2/2003 | Liebig | |
| 2003/0126852 A1 | 7/2003 | Sugishita et al. | |
| 2005/0198939 A1 | 9/2005 | Hattori et al. | |
| 2009/0076981 A1 | 3/2009 | Willson et al. | |

FOREIGN PATENT DOCUMENTS

| | | |
|---|---|---|
| EP | 0 191 687 B1 | 8/1986 |
| EP | 0299555 | 1/1989 |
| EP | 1355109 | 10/2003 |
| EP | 1 571 298 | 9/2005 |
| EP | 1 643 133 | 4/2006 |
| FR | 1350025 | 1/1964 |
| GB | 682003 | 11/1952 |
| GB | 1 242 534 | 8/1971 |
| JP | 09-209714 | 8/1997 |

OTHER PUBLICATIONS

Search Report for Application No. GB0522591.7 from the UK Patent Office, Jan. 19, 2006, 3pages.

International Search Report for PCT Application No. PCT/GB2006/050339 from European Patent Office, dated Nov. 28, 2007.

* cited by examiner

PROCESS AND PLANT FOR POWER GENERATION

CROSS REFERENCE TO RELATED APPLICATIONS

This application is the National Phase application under 35 U.S.C. §37.1 of International Application No. PCT/GB2006/050339, filed Oct. 20, 2006, which published in English as International Publication No. WO 2007/052070 A2 on May 10, 2007, and which claims priority to Application No. GB 0522591.7, filed Nov. 4, 2005, the entireties of which are incorporated by reference.

The present invention relates to a process and plant for the generation of power, in particular in steam turbines by means of a hybrid steam cycle combining a gas turbine with a steam cycle from a nuclear power plant or other steam raising plant.

One conventional steam turbine power generation plant operates according to a process in which high pressure saturated steam from a steam generator is fed, directly or indirectly, to a high pressure wet steam turbine and is expanded and cooled therein with the associated generation of power by the turbine. Cooled and expanded steam from the turbine may be supplied to a moisture separator/reheater and then via a low pressure steam turbine to a condenser. Condensed steam from the turbine may be supplied to a de-aerator and returned, generally through a feed pump and feed heaters, to the steam generator. A plant based on such a conventional wet steam cycle is described in 'Advances in Power Station Construction', GD&CD, Central Electricity Generating Board published by Pergammon Press 1986.

Conventionally, the cooled and expanded steam supplied to the moisture separator/reheater is generally separated into two streams. A first stream comprising separated moisture may be supplied to the de-aerator in combination with condensed steam from the turbine. A second stream is reheated and supplied to a low pressure steam turbine for further power generation. Reheating of this stream in the moisture separator/reheater is effected by steam from the steam generator and/or extracted from the high pressure wet steam turbine.

Steam from the low pressure steam turbine is exhausted to a condenser, from which water is pumped through one or more low pressure feed heaters before being supplied to the de-aerator and thence back to the steam generator. The low pressure feed heaters may be supplied with heating steam extracted from the low pressure turbine.

Many attempts have been made to improve the efficiency of conventional steam raising plant, in particular nuclear plant, by combining into the steam cycle the exhaust power output from a gas turbine. Examples of such attempts are disclosed in Japanese Laid-open patent publication nos. 2003027906, 11344596, 10089016, 10037717 and 3151505, and in U.S. Pat. No. 5,457,721.

Japanese Laid-open patent publication no. JP200220412 discloses a process with the aim of preventing the occurrence of steaming within a boiler fuel economizer without deteriorating plant efficiency by providing a control means for controlling the exhaust gas inflow quantity of a gas turbine to a gas turbine exhaust heat recovering heat exchanger.

US2005198939 discloses a combined cycle plant that combines a conventional thermal plant and a gas turbine plant. This technology primarily concerns a dump system connecting the main steam pipe with the condenser, bypassing the turbines in certain modes of operation of the plant.

Further combined cycle systems are described in US200337535 and US2003126852.

There is a current and growing need for efficient power generation technology in many areas of the world where supplies of energy are short. The need for such technology is likely to increase substantially because of increased fuel shortages brought about by the depletion of natural resources, and by other political, environmental and economic factors.

Despite improvements in the energy efficiency of power generation plant, there remains a need to provide an improved process and apparatus for power generation which improves energy efficiency and therefore lowers cost and damage to the environment in relation to conventional power plants.

In particular, the use of a combined cycle power plant in conjunction with a nuclear power plant using either the pressurized or boiling water cycles offers opportunities for efficiency improvement. However, it has proved difficult in practice to realise such improvements, for example because of the restrictions imposed by nuclear safety requirements and the limitations of electrical transmission network operation. Nuclear safety requirements generally mean that external disturbances to steam flows in the steam generators should be minimized or avoided. The electrical transmission network limitations mean that single breakdowns should not result in losses of generation above a defined maximum value. These restrictions limit acceptable configurations of the combined gas turbine and nuclear steam cycles. In one of its aspects, the present invention comprises a plant configuration that offers the desired high levels of efficiency within these limitations.

According to the present invention there is provided a process for power generation comprising: providing a steam generator, first, second and third steam turbines, a reheater, a gas turbine and at least one heat exchanger, the process having plural modes of operation, a first mode of operation comprising:
supplying feedwater to the steam generator and generating a steam output therefrom;
supplying a first stream comprising steam from the steam generator to the first steam turbine to generate power in the first steam turbine;
recovering from the first steam turbine a recovered stream comprising steam and supplying at least a part of the recovered stream to the reheater;
supplying a second stream comprising steam from the steam generator to the heat exchanger and heating the second stream therein by supplying at least one hot exhaust gas from the gas turbine to the heat exchanger;
supplying the heated second stream to the second steam turbine to generate power therein;
supplying a third stream comprising steam from the steam generator to the reheater to heat the recovered stream from the first steam turbine;
recovering from the reheater a heated recovered stream from the first turbine; and
supplying at least part of the heated recovered stream from the first turbine to the third steam turbine to generate power therein;

a second mode of operation of the plant comprising:
supplying feedwater to the steam generator and generating a steam output therefrom;
supplying a first stream comprising steam from the steam generator to the first steam turbine to generate power in the first steam turbine;
recovering from the first steam turbine a recovered stream comprising steam and supplying at least a part of the recovered stream to the reheater;
supplying a second stream comprising steam from the steam generator to the reheater to heat the recovered stream from the first steam turbine;

a recovering from the reheater a heated recovered stream from the first turbine; and supplying at least part of the heated recovered stream from the first turbine to the third steam turbine to generate power therein;

a third mode of operation of the plant comprising:

supplying feedwater bypassing the steam generator to the heat exchanger and heating the feedwater stream therein by supplying at least one hot exhaust gas from the gas turbine to the heat exchanger;

recovering heated steam from the heat exchanger and supplying at least part of the recovered heated steam stream to the second steam turbine to generate power therein.

It is an important and advantageous feature of the present invention that the process is operable to generate power in at least the first steam turbine, and preferably also at least the third steam turbine even under circumstances where the hot exhaust gas output from the gas turbine is diminished or interrupted. The process does not rely on heat output from the gas turbine to generate power or to permit the normal production of steam in the steam generator. Rather, heat output from the gas turbine provides a supplementary source of heat (and thereby eventually of power) when the gas turbine is operational. In addition, one particularly advantageous feature of the invention provides that when the gas turbine is operational the exhaust heat therefrom may be used to generate steam for power generation even when the steam generator is non-operational, for example during a shut-down or refueling period. This minimizes the loss of power produced in case of a shutdown of the heat source for the steam generator.

In one preferred process in accordance with the invention the heat exchanger has plural zones, including at least a first zone and a second zone.

In the first mode of operation of the plant the second stream comprising steam from the steam generator is preferably supplied to the first zone of the heat exchanger.

In the third mode of operation of the plant the feedwater bypassing the steam generator is preferably supplied to the second zone of the heat exchanger. In this case the feedwater is heated and at least partially evaporated in the second zone of the heat exchanger, and the process comprises:

supplying the at least partially evaporated heated feedwater stream to a separator; and recovering from the separator a steam stream and supplying said steam stream to the first zone of the heat exchanger.

In one preferred first mode of operation the process comprises:

providing an auxiliary heating stream from the second zone of the heat exchanger, the auxiliary heating stream being heated in the second zone of the heat exchanger by the at least one hot exhaust gas; and supplying the auxiliary heating stream to the reheater to heat at least part of the recovered stream from the first steam turbine and/or to a feedheater to preheat at least part of the feedwater supplied to the steam generator.

In another preferred first mode of operation the process comprises:

providing feedwater to the second zone of the heat exchanger, the feedwater stream being heated in the second zone of the heat exchanger by the at least one hot exhaust gas;

recovering a heated feedwater stream from the second zone of the heat exchanger and supplying the recovered heated feedwater stream to a separator;

recovering from the separator the heated feedwater stream and supplying the recovered stream to the steam generator as at least part of the feedwater supplied thereto.

Preferably in said first mode of operation of the plant, the second stream from the steam generator is supplied to the first zone of the heat exchanger at a temperature and pressure not substantially below that of the second stream as it is recovered from the steam generator. For example, the pressure of the second stream as it is supplied to the first zone of the heat exchanger is not more than about 15%, preferably not more than about 10%, most preferably not more than about 5% below the pressure of the second stream as it exits the steam generator.

Conveniently, in said second mode of operation of the plant, the second stream from the steam generator is supplied directly to the heat exchanger, by which is meant in particular that it is not first supplied as input to any steam turbine or heat exchanger.

In one process according to the invention the first steam turbine is a wet steam turbine and the steam in the first stream from the steam generator is supplied at or at close to a saturated condition. The first steam turbine preferably operates under a high pressure condition, by which is meant by way of example only that the pressure of steam supplied thereto is at least about 40 bar abs. The third steam turbine preferably operates under a relatively low pressure condition, by which is meant by way of example only that the pressure of steam supplied thereto is less than about 10 bar abs. Preferably the second steam turbine is operable at a pressure intermediate between that of the first and third steam turbines, more preferably at a pressure as close as possible to that of the first steam turbine.

Preferably the first steam stream is supplied from the steam generator at a pressure of from about 40 to about 80 bar abs.

Preferably the temperature and pressure of the second steam stream are substantially the same as the first steam stream.

Preferably the temperature and pressure of the third steam stream are substantially the same as the first steam stream also.

Preferably, the first stream comprises the majority of the steam generator output, for example at least about 55% thereof, more preferably at least about 70% thereof.

Steam supplied to the second steam turbine is cooled and expanded therein to produce an output stream which may be fed, in whole or in part, to the third steam turbine. However, if desired, the second steam turbine may be provided with multiple zones comprising a first higher pressure zone and a second, lower pressure zone. In this case, cooled and expanded steam from the first zone may be at least partly supplied to the second zone. Output from the second zone may be passed to a condenser, and the condensate returned to join the condensate flow from the third steam turbine to the heat exchanger and/or to one or more feedheaters to the de-aerator.

Preferably the reheater also functions as a moisture separator. Wet steam exhausted from the first steam turbine is passed to the moisture separator/reheater which removes moisture droplets which are returned directly or indirectly as feedwater for the steam generator. The recovered moisture stream may be supplied to the de-aerator separately or together with the part of the recovered stream from the first steam turbine. As with the first steam turbine recovered stream part, the moisture supplied to the de-aerator may be passed to the steam generator via a feed pump and at least one, optionally high pressure, feed heater.

The reheater may be constructed as a single unit, with means for supplying a heating stream from the steam generator, and means where needed for supplying an auxiliary heating stream from the heat exchanger. However, and this may be especially preferred if a plant operating the process of the construction is retro-fitted onto existing plant, the reheater may be divided into two (or more) units. The recovered stream from the first steam turbine is then divided and a first recovered stream part supplied to a first reheater unit supplied with a heating stream from the steam generator. A second recovered stream part is supplied to a second reheater unit supplied with a heating stream from the heat exchanger. Preferably, the recovered stream flow is switchable so that the flow through the second reheater unit can be stopped or altered in response to interruptions or fluctuations in the gas turbine output.

The output streams from the second and third steam turbines are preferably supplied, in whole or in part to one or more condensers. In one preferred process according to the invention at least part of the merged output streams from the condensers is supplied to a third zone of the heat exchanger and heated therein by supplying at least one hot exhaust gas from the gas turbine to the third zone of the heat exchanger. The heated recovered condensate may then be returned to the de-aerator together with moisture separated in the reheater and heated with steam from the recovered stream from the first turbine.

Preferably the water from the de-aerator is supplied to a feedwater pump which pressurizes it and applies the stream to at least one high pressure feedwater heater. The recovered heated stream from the at least one feedwater heater is supplied to the steam generator. The at least one feedwater heater may be supplied with steam extracted from the first steam turbine to heat the feedwater.

In one advantageous arrangement of the invention at least part of the pressurized feedwater stream is supplied to a high temperature feedheater where it is heated by an auxiliary heating stream. Preferably the auxiliary heating stream is supplied from the second zone of the heat recovery heat exchanger where it is heated by the at least one gas turbine exhaust gas stream. The heated stream from the high temperature feedheater is supplied to the steam generator. Preferably the feedwater flow through the high temperature feedheater can be switched or altered in response to the interruption or variation in gas turbine output.

In another preferred process the heated recovered condensate from the third zone of the heat exchanger may be supplied to a second deaerator. In this alternative process the separate at least one feed pumps pressurize the water from the second deaerator and deliver low temperature feedwater to the second zone of the gas turbine energy recovery heat exchanger.

The heat exchanger is preferably arranged so that the at least one hot exhaust gas is passed against at least one first heat transfer surface in the first zone of the heat exchanger to heat second stream from the steam generator, so that the at least one hot exhaust gas is passed against at least one second heat transfer surface in the second zone of the heat exchanger to heat the auxiliary heating stream for the reheater, and so that the at least one hot exhaust gas is passed against at least one third heat transfer surface in the third zone of the heat exchanger to heat the recovered condensate stream from the condenser, or part of it. Preferably, the at least one hot exhaust gas from the gas turbine is passed sequentially against the at least one first heat transfer surface, the at least one second heat transfer surface and the at least one third heat transfer surface, becoming progressively cooler from the first to the third zones of the heat exchanger. The thus cooled at least one hot exhaust gas may then be discharged from the plant by any suitable means, such as by means of a stack.

The heat exchanger may be constructed as a single unit with multiple stages therein, or may be constructed as separate units, preferably arranged in series.

In one preferred process according to the invention the total enthalpy of the at least one hot exhaust gas stream supplied from the gas turbine is from about 0.05 to about 0.35, preferably from about 0.05 to about 0.25, most preferably from about 0.1 to about 0.2, of the net enthalpy of materials recovered from the steam generator (that is the enthalpy of the first steam stream supplied from the steam generator minus the enthalpy of feedwater stream).

Prior art thermal cycles for power plant have attempted to achieve the highest efficiency. However, thermodynamic limitations of the cycles, the process media properties and physical limitations of the materials used for construction of the plant embodying the cycle restrict the feasible performance of real plant. The different thermal cycles have been refined to maximise performance. Occasionally cycles have been combined to enhance overall performance, for example adding 'topping' or 'bottoming' cycles using different processes or process media.

The subject of this invention is a hybrid thermal cycle combining two sources of heat into a cycle, one supplying the latent heat of evaporation in a steam cycle and the other being the exhaust heat from a gas turbine. The heat in the gas turbine exhaust is used to provide the feedheating, reheating and superheating of a steam cycle while the other source provides the latent heat of evaporation for the steam cycle. This second heat source may conveniently be a nuclear reactor using pressurised water or boiling water in the primary cooling circuit, although chemical processes may provide heat under suitable conditions for the use of the cycle.

The power generation process of the invention represents a significant improvement in the energy efficiency of conventional power generation plants, for example fossil fuel plants with steam turbine cycles, integrated fossil fuel gasification combined cycle plants or gas or oil fired combined cycle gas turbine plants.

The process of the invention when exemplified in a preferred process in accordance with the invention has the following significant advantages.

It significantly improves the thermal efficiency of both the gas turbine and the saturated steam cycles integrated in the hybrid cycle. The net efficiency of the hybrid cycle may for example be about 39%-42% compared with the base saturated steam cycle at 37%.

When the improvements are attributed to the addition of the gas turbine cycle, the efficiency of gas to additional power compared with the original saturated steam cycle is substantially higher than can be realised by other means, achieving over 60% net conversion efficiency.

The specific capital cost of the additional capacity of the hybrid plant is comparable with that for a combined cycle gas turbine rather than a conventional power plant or nuclear plant. The modifications to the saturated steam cycle change the distribution of cost between the plant items but generally reduce the overall cost compared with a standard saturated steam cycle.

The specific operating and maintenance costs for the cycle are lower than for a comparable combined cycle gas turbine plant as the net capacity is significantly increased for the same gas turbine maintenance costs.

The higher fuel conversion efficiency and lower specific capital and operations and maintenance costs of the generating capacity enables power to be generated from gas at a significantly lower cost than any available alternative technologies, typically offering output at about 85% of the cost of a conventional combined cycle gas turbine plant with the same cost of fuel.

Configuration of the integrated steam cycle minimises the impact of disturbances in the gas turbine cycle, such as gas turbine shutdowns, on the saturated steam plant and enables the saturated steam generator to continue to function normally despite such disturbances. The small effects on the steam generator mean that safety issues related to any nuclear primary circulation through the steam generator are minimized.

The additional capacity from the gas turbine cycle can be despatched flexibly according to power demand without significantly affecting the saturated steam plant.

The configuration of the heat exchangers in the gas turbine heat recovery system avoids large thick-sectioned evaporators so that start-up and load changing of the capacity associated with the gas turbine can be significantly faster than for a conventional combined cycle gas turbine plant.

Breakdown of either the gas turbine plant or the nuclear heat supply to the steam generator do not result in a total loss of generated output. The breakdown cases have a predictable loss of output to the electrical transmission network which are comparable with the currently accepted values for an independent combined cycle power plant or conventional nuclear plant respectively.

The improved efficiency of fuel conversion results in environmental benefits including reductions of around about 20% of emissions per unit of energy delivered of carbon, sulphur and nitrogen oxides and lower thermal discharges to the environment compared with the best available fossil fuelled plant. The additional lower cost generating capacity will displace older more expensive plant with higher emissions, further reducing the overall discharges to the environment.

The concept can be applied to new power plant or to existing saturated steam cycle plant with similar benefits.

The heat exchange tubes may be of any suitable material, such as the various grades and specifications of steel appropriate to the internal and external conditions and may included extended surfaces such as finning necessary for optimum heat transfer.

The invention will now be more particularly described with reference to the following drawings, in which.

Figure 1:
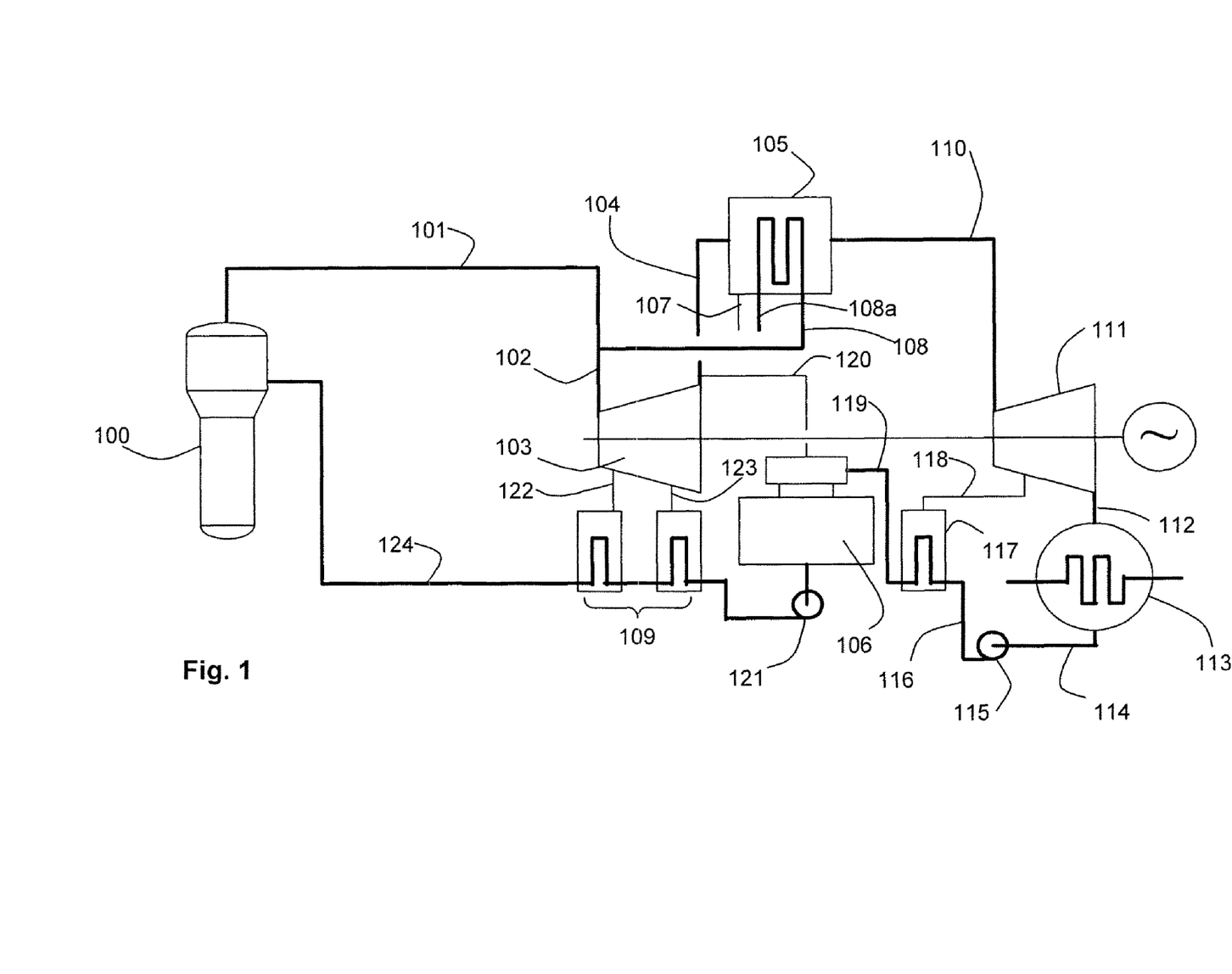
FIG. 1 shows a flow diagram of the conventional wet steam cycle of a power generation plant.

The underlying cycle for energy conversion from saturated steam generated by a nuclear steam generator or a similar chemical process is illustrated in FIG. 1.

Referring to FIG. 1, steam at saturation condition is generated in steam generator 100 and is passed in line 101 and separated into two streams. A first stream comprising the major part flows in line 102 to high pressure steam turbine 103. Power is generated in steam turbine 103 and, after expansion to a defined level of steam wetness, the steam is exhausted from steam turbine 103 through line 104 to moisture separator/reheater 105. In this vessel entrained moisture is largely removed and drained to deaerator 106 in line 107, although the connection between line 107 and deaerator 106 is not shown in FIG. 1 for simplicity.

Remaining steam in moisture separator/reheater 105 is heated using steam from steam generator 100 supplied in line 108 and/or from steam turbine extractions (not shown). The heating steam in line 108 condenses in reheater 105 and the resulting high pressure water is returned through a pressure let down valve to the condensate system of high pressure feedheaters 109, although neither the let down valve nor the link between line 108a and feedheaters 109 are shown in FIG. 1.

Reheated steam from reheater 105 is admitted via line 110 to low pressure steam turbine 111 which expands the steam to exhaust through line 112 into condenser 113. Water is recovered from condenser 113 in line 114 and pumped by pump 115 into line 116 and then through one or more low pressure feedheaters 117, only one being shown in FIG. 1. Low pressure feedheater 117 is heated by steam extracted in line 118 from low pressure turbine 111, and the resulting heated stream is supplied in line 119 to de-aerator 106. The heating steam is condensed in the feedheater 117 and the resulting warm water is cascaded via any lower pressure feedheaters (not shown) to condenser 113 (not shown).

Deaerator 106 removes dissolved gases from the condensed water using vigorous direct contact heating with steam supplied in line 120 from the exhaust of high pressure turbine 103, or other turbine steam extraction. The resulting de-aerated water is pumped to high pressure by one or more feed pumps 121 before passing through one or more high pressure feedheaters 109. The high pressure water is heated in feedheaters 109 with steam extracted in lines 122 and 123 from steam turbine 103, and with hot water from reheater 105 condensed from steam in line 108, to a temperature suitable for admission to steam generator 100 and is supplied thereto in line 124. Heating steam condensed in feedheaters 109 and the hot water heating flow are cascaded to any lower pressure heaters or to the deaerator (not shown in FIG. 1).

Figure 2:
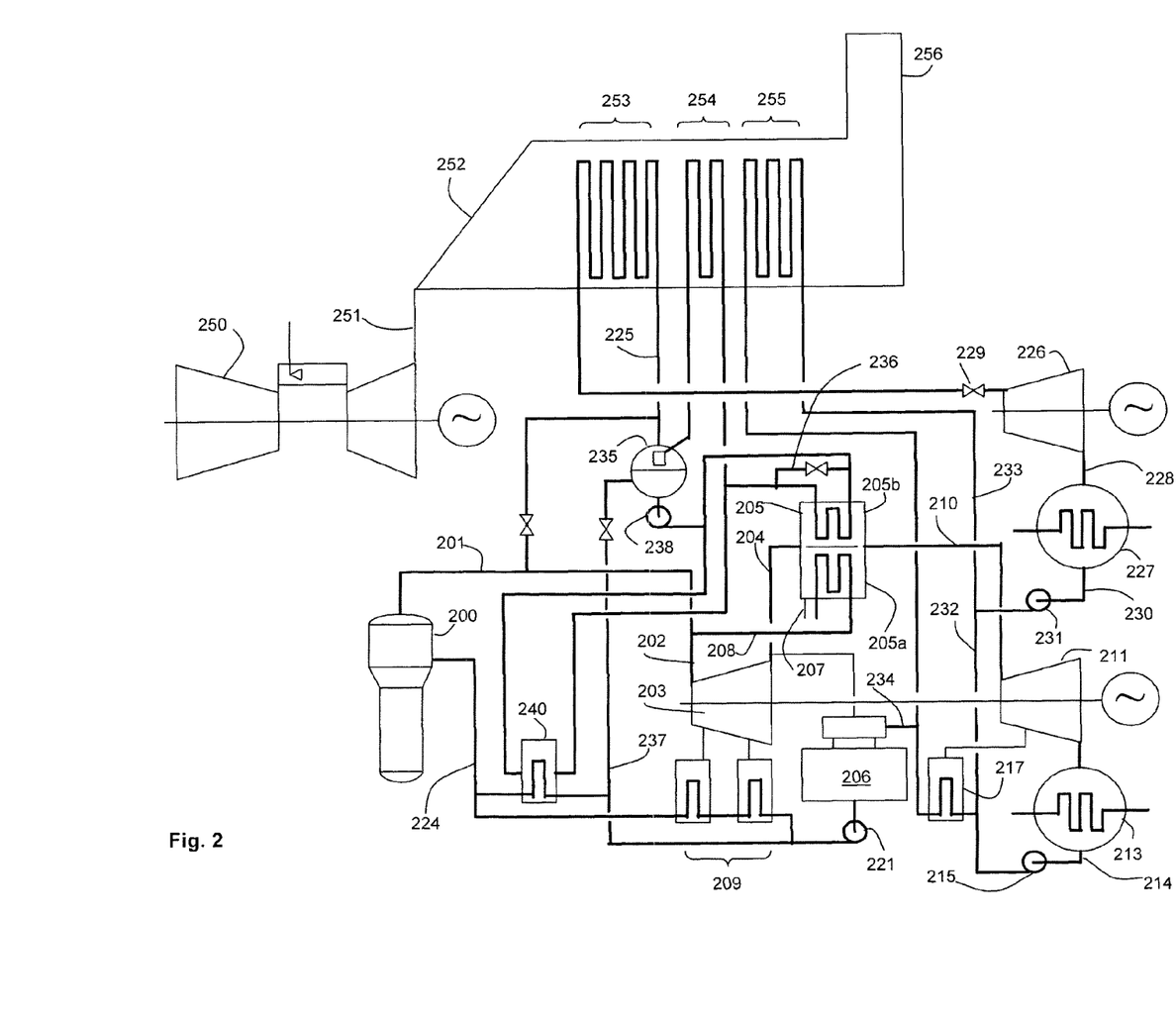
FIG. 2 shows a flow diagram of a hybrid power generation plant arranged to operate according to a first process of the invention.

The hybrid cycle of the invention integrating the gas turbine and, in the case shown, nuclear steam cycles is shown in FIG. 2.

Referring to FIG. 2, gas turbine 250 produces hot exhaust gases which are passed in line 251 through energy recovery heat exchanger 252. The exhaust flows in turn over heat transfer surfaces with their outlet passes at the side facing the incident hot gases to maintain a near constant temperature difference between the external hot gases and the internal process fluid. The first zone of the heat transfer surface, in contact with the hottest gases, is steam superheater 253, the second is intermediate temperature section 254, which uses pressurised hot water as an intermediate heat exchange medium. The final heat exchange surface is economiser section 255 which heats water directly from condenser 213 of steam turbine 211 and which heats water directly from condenser 227 of steam turbine 226, or after passage through one or more feedheaters (not shown). The cool exhaust gases are finally discharged via stack 256.

The steam flows in the cycle are integrated with the conventional steam turbine cycle for saturated steam as follows. Saturated steam from steam generator 200 is supplied in line 201 and is divided into three, with a large part flowing in line 202 to wet steam turbine 203, another part passing in line 225 to superheater 253 for heating, while the balance flows in line 208 to moisture separator and reheater 205a.

The steam heated in superheater 253 in gas turbine energy recovery heat exchanger 252 is delivered at high temperature to secondary steam turbine 226 which exhausts into condenser 227 via line 228. Condensed water is recovered via line 230 and pump 231 to mix with the condenser flow from the low pressure steam turbine 211 in line 232. Steam flow through steam turbine 226 is set by inlet valve 229 and is preferably controlled to maintain a constant steam temperature at the superheater outlet.

Saturated steam flows though the high pressure turbine 203 which exhausts wet steam in line 204 to moisture separator/reheater 205. Moisture separator 205 removes most of the entrained water droplets, draining them in line 207 to deaerator 206 (via a link not shown in FIG. 2), and the steam remaining in moisture separator/reheater 205 is reheated. The steam flows through the reheater 205 in two parallel flows. The first flow, in section 205a, is heated by saturated steam in line 208 from steam generator 200 and/or with bled steam (not shown) from high pressure turbine 203. The heating steam is condensed in the reheater and the condensed water is returned to the condensate system of high pressure feedheaters 209 via a link not shown in FIG. 2. The second steam flow, in section 205b, is heated indirectly by the heat from the intermediate temperature section 254 in the gas turbine energy recovery heat exchanger 252. The steam entering the reheater flows in turn over heat transfer surfaces with their outlet passes at the side receiving the highest temperature fluid from the heat exchanger to maintain a near constant temperature difference between the external steam and internal process fluid. The indirect heat exchange circuit shown uses pressurised water circulated by pump 238.

Reheated steam from moisture separator/reheater 205 is recovered in line 210 and expanded through low pressure steam turbine 211. The steam from turbine 211 passes in line 212 to condenser 213 and the condensed water is recovered in line 214 and pumped by pump 215 through one or more low pressure feedheaters 217 to deaerator 206. Steam extracted from between stages of the steam turbine is used to supply heat to the feedheaters. The water condensed in the feedheaters is cascaded (not shown) to a feedheater at lower temperature or discharged into condenser 213.

Part of the water flow from condenser 213 is separated in line 233 and is passed through economizer 255 in energy recovery heat exchanger 252 to be heated and returned to deaerator 206 in line 234.

Dissolved gases are removed by vigorous direct contact heating of water droplets by steam in the deaerator 206. The heating steam for the deaerator is taken either from the exhaust or from between stages of high pressure steam turbine 203. The water from deaerator 206 is pumped to high pressure by one or more feed pumps 221 and further heated by one or more high pressure feedheaters 209 to a temperature suitable for return to the steam generator 200 in line 224. The high pressure feedheaters are heated with steam extracted from between stages of the steam turbine 203 and with hot water from the condensed heating steam flows to reheater 205. The steam condensed in the feedheaters and the water flows are cascaded (not shown) to a feedheater at lower pressure and/or to the deaerator 206.

Part of the water delivered by the one or more feed pumps 221 flows through the high temperature feedheater 240, mixing in line 224 with the flows from the high pressure feedheaters 209 to the steam generator 200. The high temperature feedheater 240 is supplied with high temperature water from the intermediate temperature section 254 of the gas turbine energy recovery heat exchanger 252.

In another arrangement of the hybrid power generation plant of FIG. 2, intermediate temperature section 254 of heat exchanger 252 may function as a dual mode exchanger, heating water in a first mode of operation and raising steam in a second mode of operation. In a hybrid mode of operation the heat exchanger performs both of these functions. In this hybrid mode of operation, when both steam generator 200 and gas turbine 250 are in operation, steam from steam generator 200 is heated by gas turbine exhaust gases in exchanger zone 253 and expanded through steam turbine 226. Hot water is circulated through heat exchanger 254 heated by gas turbine exhaust gases, and passing through separator 235 to reheater 205b via pump 238 to heat the exhaust steam flow of turbine 203. Sufficient water flow is circulated to ensure minimal boiling in exchanger 254 under this condition; any steam generated is separated in separator 235 and combined in line 225 with the steam flow to heat exchanger 253 from steam generator 200. The circuit is replenished with water in line 237 supplied through feed pump 221.

When gas turbine 250 is out of operation, steam from steam generator 200 is expanded through steam turbine 203, heated in reheater 205a using the stream of steam from steam generator 200 in line 208 and expanded in steam turbine 211 before flowing to condenser 213. The condensate is heated in low pressure feedheater 217, deaerator 206 and pumped through high pressure feedheaters 209 before delivery to steam generator 200 in line 224. When gas turbine 250, heat recovery exchanger 252, reheater 205b and steam turbine 226 are out of operation, no water or steam flows through these elements and no power is generated in them.

When the reactor (providing the heat source for steam generator 200) is out of operation, water is circulated by pump 238 through heat exchanger 254 heated by exhaust gases of the gas turbine 250 and partially evaporated to steam. The mixed phase flow is separated in separator 235. Pump 221 delivers feedwater from deaerator 206 to replace evaporated steam and the mixed water recirculated by pump 228, bypassing reheater 205b in bypass line 236. The steam from separator 235 flows into heat exchanger 253, is heated by the gas turbine exhaust gases and expanded in steam turbine 226 and, if present (although not shown in FIG. 2) any additional low pressure secondary steam turbine stage, as described in FIG. 4. Steam from turbine 226 is exhausted into condenser 227, and the condensate preheated in heat exchanger 255 by exhaust gases of the gas turbine. The hot condensate is returned to deaerator 206 to complete the cycle. Steam generator 200, steam turbine 208 and reheaters 205a and 205b, and associated plant are out of service in this condition.

The process can be applied to existing saturated steam turbine plant but a slightly different configuration of reheater may be preferred in some cases to facilitate the integration. This configuration is shown in FIG. 3.

Figure 3:
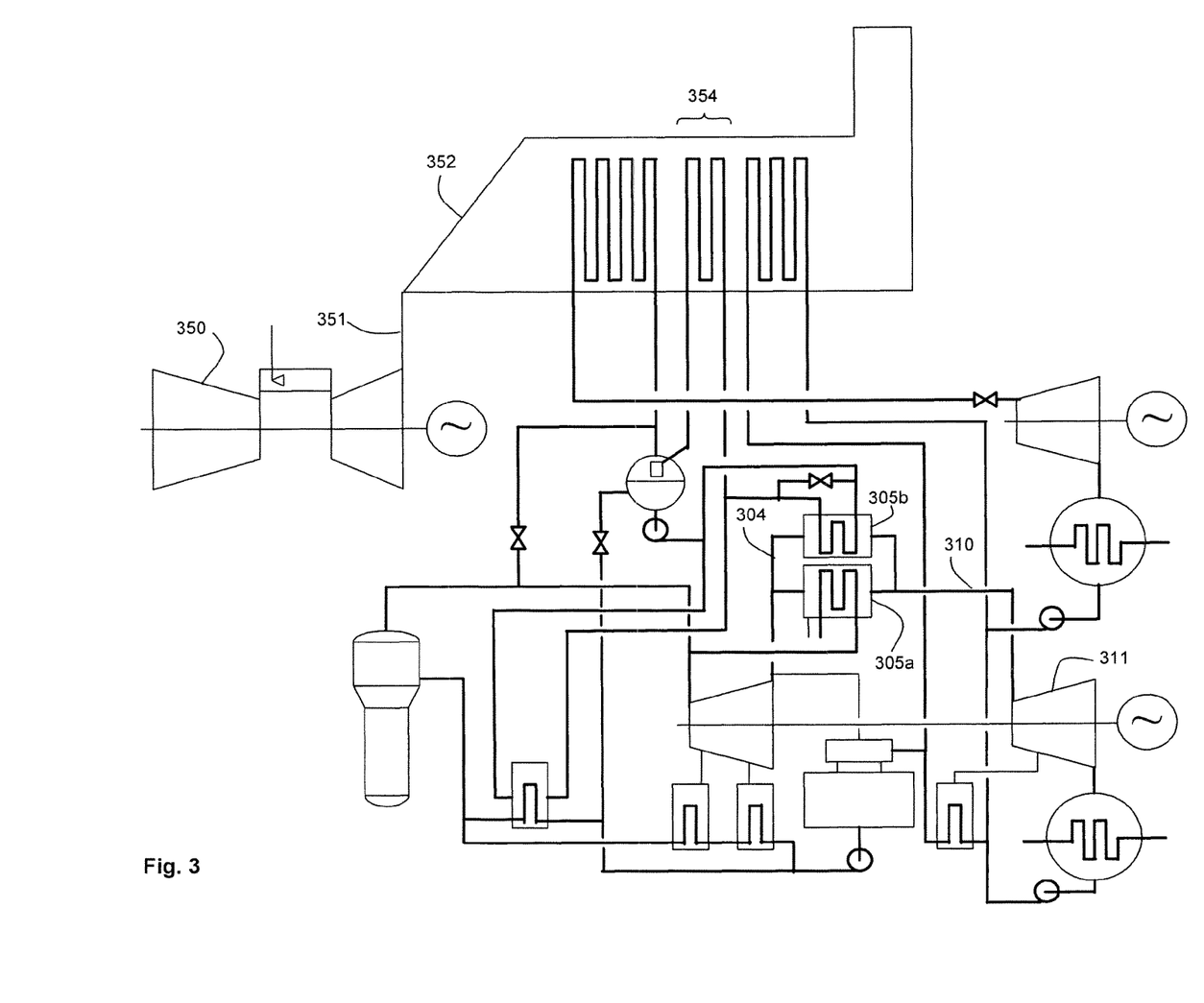
FIG. 3 shows a flow diagram of a hybrid retro-fit power generation plant arranged to operate according to a second process of the invention.

Referring to FIG. 3, the cycle applied to existing plant follows the process and references as described for FIG. 2 except as follows.

The two flow reheater associated with the main steam cycle comprises the existing reheater 305a and second reheater 305b which heats part of the steam turbine exhaust flow through line 304 using heat from intermediate temperature section 354 in the energy recovery heat exchanger 352. The flows recovered from the two reheater sections mix in line 310 and are supplied to the existing low pressure steam turbine 311.

The process can be applied to existing saturated steam turbine plant but a slightly different steam turbine configuration may be preferred in some cases. This alternative configuration is shown in FIG. 4.

Figure 4:
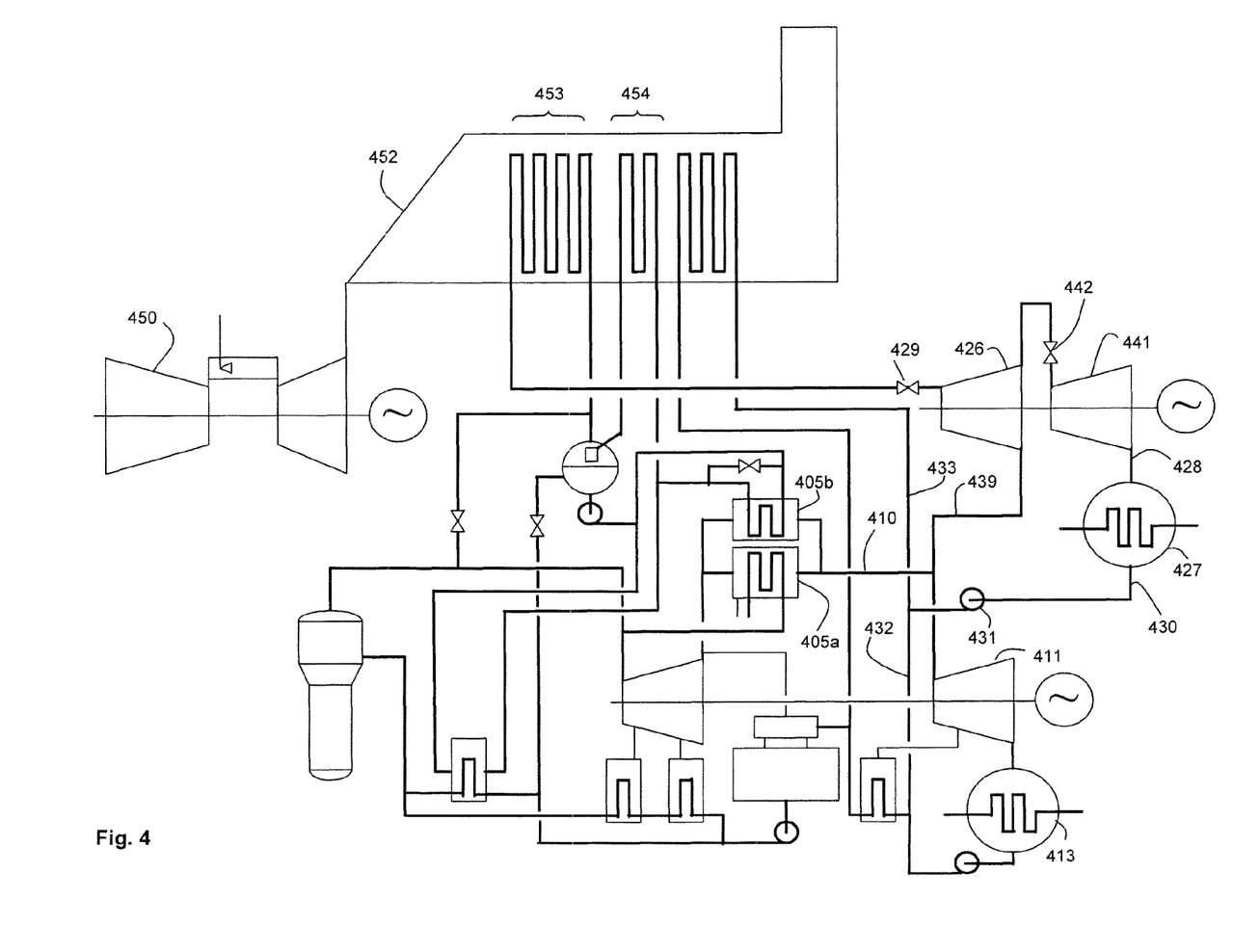
FIG. 4 shows a flow diagram of a hybrid power generation plant arranged to operate according to a third process of the invention.

Referring to FIG. 4 the cycle applied to existing plant follows the process and references as described for FIG. 2 and FIG. 3 except as follows:

Secondary steam turbine 426 is extended with the addition of low pressure stage 441 and condenser 427 to handle the additional condensing steam flow arising from the heat input from gas turbine 450. Admission of steam to the low pressure stage 441 of secondary turbine 426 would be controlled by throttle valve 433. The condensed water from additional condenser 427 is pumped into the low pressure feed heating system by pump 431 to join the flow in line 432 from condenser 413 of existing low pressure turbine 411.

The cycle can be applied to nuclear plant where the steam generator is a nuclear reactor. In this case the steam cycle of the gas turbine needs to be isolated from that of the steam generator as is shown in FIG. 5.

Figure 5:
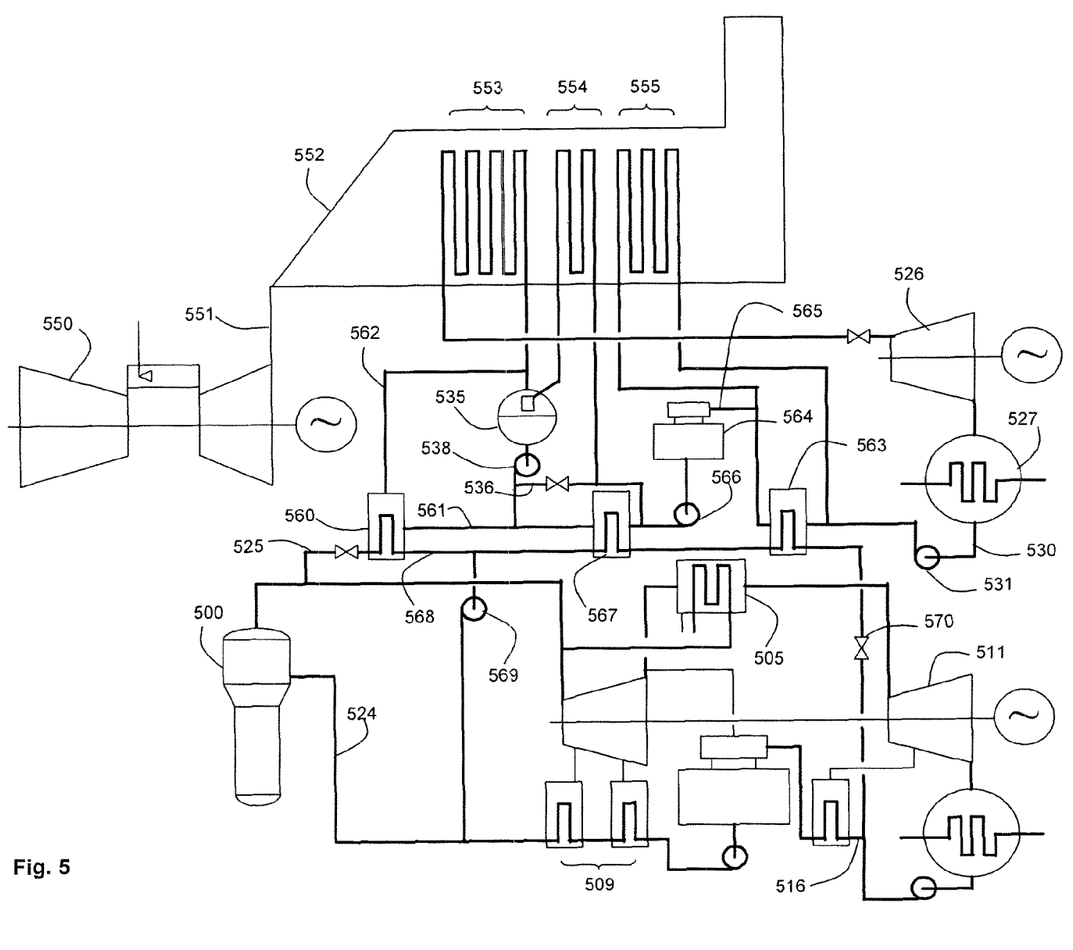
FIG. 5 shows the flow diagram of a hybrid power generation plant arranged according to the fourth process of the invention.

Referring to FIG. 5, the cycle applied to the plant follows the process and references as described for FIG. 2 except as follows:

The second stream from steam generator 500 is carried by line 525 to steam heated evaporator 560. Secondary steam is generated by evaporating the feedwater delivered in line 561 by condensing the incoming flow from line 525. The secondary steam is supplied by line 562 to the superheater 553 for heating and is delivered at high temperature to steam turbine 526 which exhausts into condenser 527. Condensed water is recovered via line 530 and delivered by pump 531 as a stream which is divided into two parallel streams for heating and delivery to second deaerator 564. The first stream is delivered to feedheater 563 while the second part is delivered to economizer 555 in energy recovery heat exchanger 552. The heated recovered streams from the feedheater and economizer are mixed and delivered to the second deaerator 564 in line 565.

The second deaerator 564 removes dissolved gases from the condensed water using vigorous direct contact heating with steam supplied to the deaerator from the separator 535 or steam turbine extraction (connections not shown for clarity). The resulting hot water, pumped to high pressure by the one or more feed pumps 566, is divided into two streams. The first stream is delivered to the intermediate temperature section 554 of the gas turbine energy recovery heat exchanger 552. The heated recovered stream is delivered to separator 535 and pumped by pump 538 into line 561. The second stream delivered by the one or more feed pumps 566 is heated in the water to water feedheater 567 and recovered into line 561. The mixed heated water flow in line 561 is delivered to the steam heated evaporator 560 to generate secondary steam.

The steam flow from line 525 condensed in the steam heated evaporator is recovered via line 568 and divided into two parts. The first part is delivered by pump 569 to mix in line 524 with the heated feedwater from feedheaters 509 to be supplied to the steam generator 500. The second part is delivered to water to water feedheater 567 where it heats part of the stream from the one or more feed pumps 566. The recovered cooled part is delivered to feedheater 563 where it heats part of the condensate pumped from the condenser 527. The cooled condensed stream is reduced in pressure in valve 570 and returned to the main cycle in line 516.

The cycle can be applied to nuclear plant where the steam generator isolates the whole steam cycle from the nuclear reactor. In this case the steam cycle of the gas turbine may be preferred to be simplified as is shown in FIG. 6.

Figure 6:
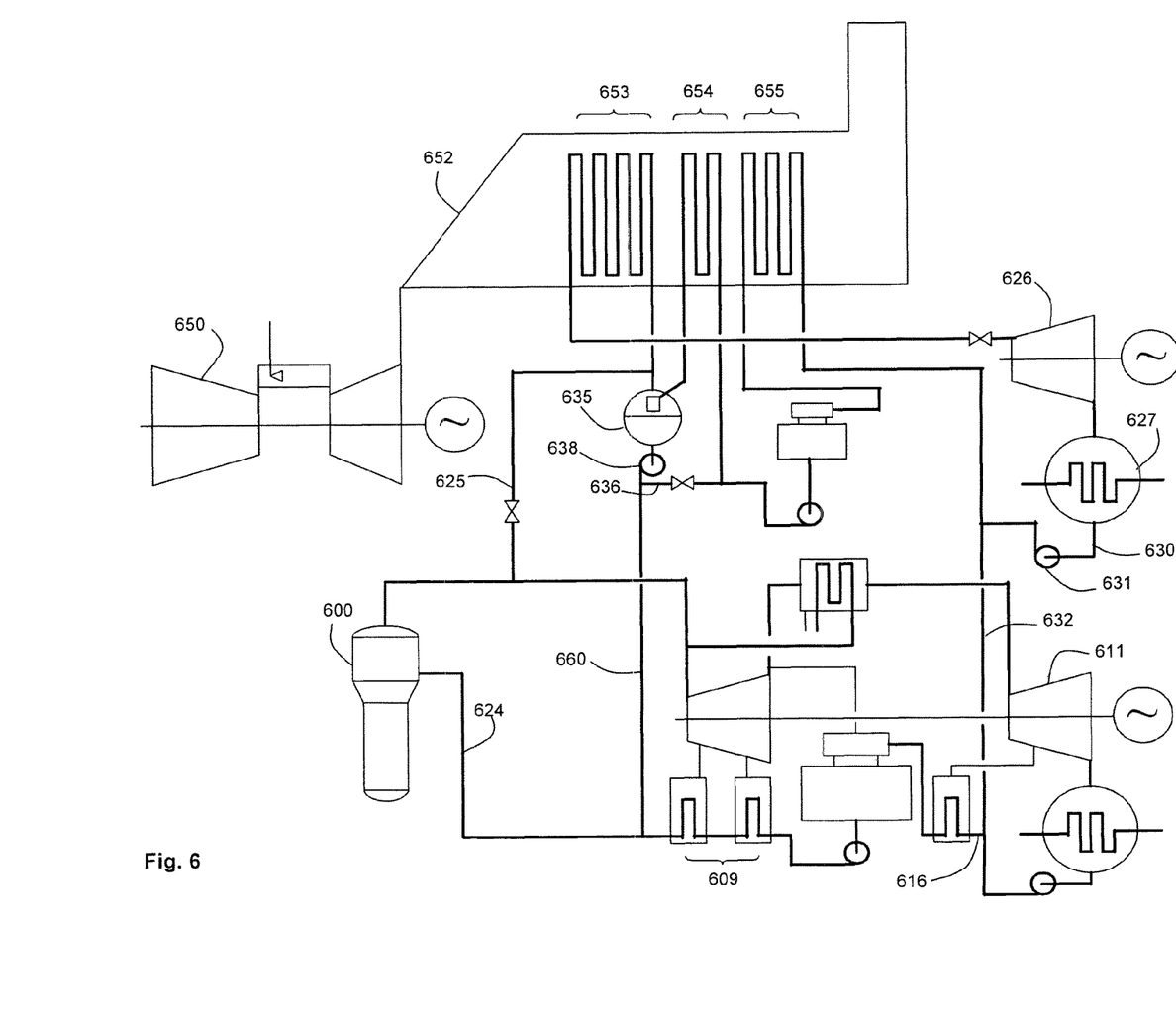
FIG. 6 shows the flow diagram of a hybrid power generation plant arranged according to the fifth process of the invention.

Referring to FIG. 6, the cycle applied to the plant follows the process and references as described for FIG. 5 except as follows:

The second stream of steam from the steam generator 600 is delivered via line 625 to superheater 653 of the energy recovery heat exchanger 652 heated by exhaust gases from gas turbine 650. The heated steam is expanded through steam turbine 626 to generate power and exhausted to condenser 627.

Part of the stream from the condenser 627 is delivered by pump 631 for heating in the economizer 655 of the gas turbine energy recovery heat exchanger 652. The other part is supplied via line 632 to mix with to the condensate from the third steam turbine 611 in line 616.

The high temperature stream from the intermediate temperature section 654 of the energy recovery heat exchanger is supplied to separator 635. The water phase is delivered by pump 638 via line 660 to mix with the feedwater stream to the steam generator 600 in line 624.

The process of the invention has one or more of the following advantages:

- Loss of power production on shutdown of the (e.g. nuclear) steam generator is minimised, being limited for example to significantly less than 10% more than the normal output capacity of the nuclear power plant.
- While outstanding efficiency of the gas turbine cycle is achieved in integrated operation with the nuclear cycle, operation of the gas turbine cycle is maintained at reasonably high efficiency while the reactor is out of service. Thus the high availability of the gas turbine cycle contributes to revenues while the nuclear plant is shutdown, e.g. for refueling.
- Start-up and shutdown of either the (nuclear) steam generator or the gas turbine can be accomplished flexibly, simply and with minimum mutual interference, maintaining safety provisions for the nuclear steam system while permitting flexible dispatch of the gas turbine cycle capacity.
- The enhanced robustness of the gas turbine cycle operation on shutdown of the (nuclear) steam generator increases the integrity of power generation available to support safe reactor operation during the critical shutdown period.
- Transitions of conditions in the heat exchanger between water heating and boiling modes are smooth and self regulating so that operation is simplified and cycle behaviour is tolerant of changes in steam cycle or gas turbine conditions.
- The construction of the gas turbine and nuclear plants can be undertaken at different times while permitting operation at reduced efficiency prior to completion of the hybrid cycle.
- The design of the heat exchanger zones and the separator in FIGS. 2-6 are conventional for energy recovery heat exchangers in combined cycle gas turbine power plant so that costs of construction are minimised.
- The design of the steam and water cycle associated with the gas turbine can be designed for maximum independence from the nuclear steam cycle so that interfaces for a retrofit can be minimised and any potential safety case impacts reduced to the lowest possible level.

EXAMPLE 1

Figure 7:
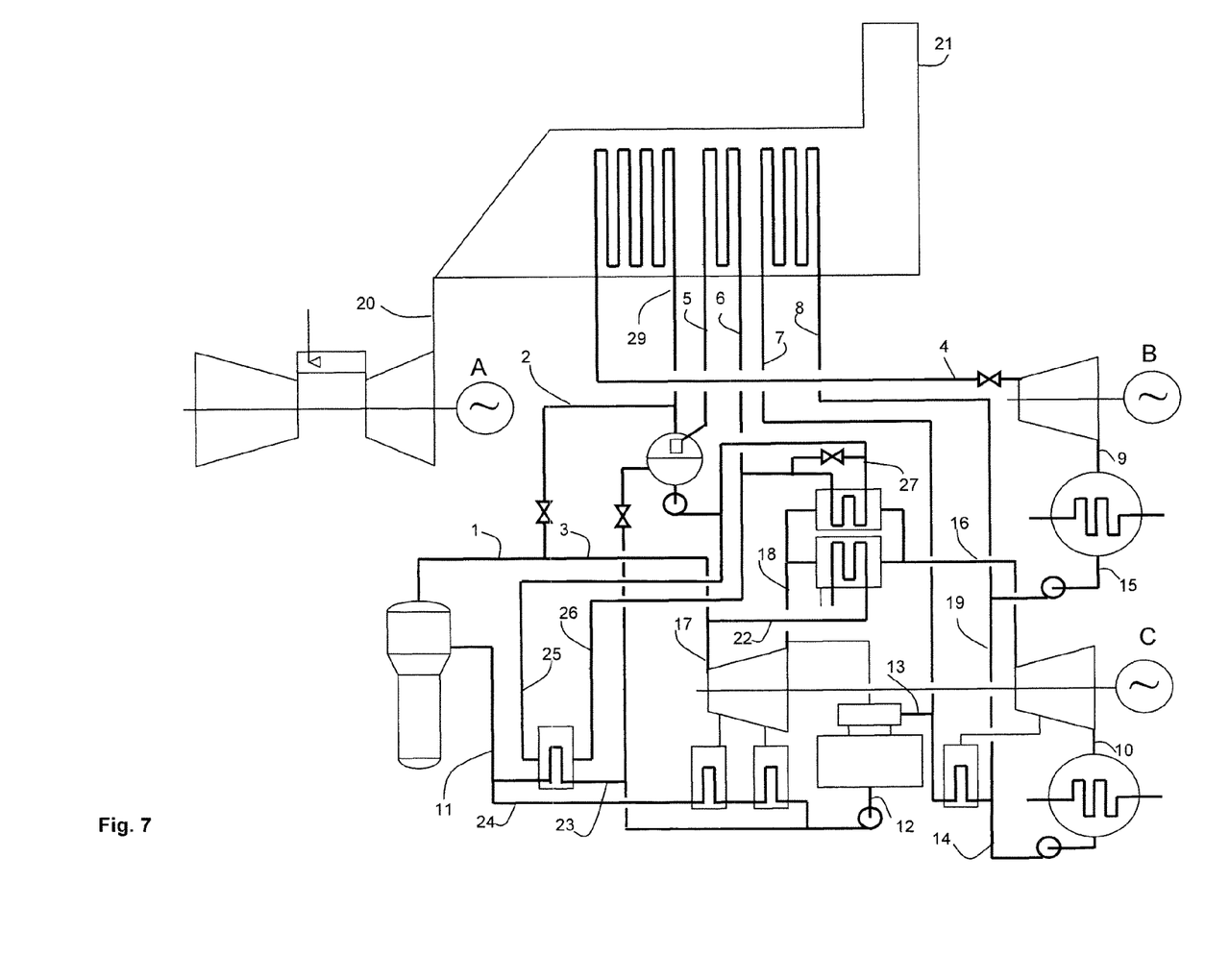
FIG. 7 shows the same flow diagram as FIG. 2 but with reference numerals relevant to Example 1, 2 and 3 below.

A plant designed in accordance with FIG. 7 (with both steam generator and gas turbine operational, additional reheater in service) was modeled with the results shown in Table 1.

TABLE 1

| Stream | temperature deg. C. | pressure bar. a | flow kg/s | enthalpy kJ/kg |
|---|---|---|---|---|
| 1 | 283 | 66.77 | 1866 | 2774 |
| 2 | 283 | 66.77 | 285 | 2774 |
| 3 | 283 | 66.77 | 1581 | 2774 |
| 4 | 539 | 63.43 | 285 | 3510 |
| 5 | 289 | 72.90 | 155 | 1285 |
| 6 | 172 | 72.90 | 155 | 731 |
| 7 | 173 | 25.00 | 125 | 733 |
| 8 | 24 | 25.00 | 125 | 104 |
| 9 | 24 | 0.03 | 285 | 2221 |
| 10 | 27 | 0.035 | 801 | 2336 |
| 11 | 217 | 82.74 | 1866 | 932 |
| 12 | 149 | 4.68 | 1866 | 630 |
| 13 | 149 | 4.68 | 665 | 665 |
| 14 | 27 | 82.74 | 982 | 121 |
| 15 | 24 | 0.03 | 285 | 101 |
| 16 | 276 | 4.63 | 969 | 3015 |
| 17 | 283 | 66.77 | 1508 | 2774 |
| 18 | 149 | 4.68 | 1132 | 2431 |
| 19 | 24 | 25.00 | 160 | 104 |
| 20 | 575 | 1.03 | 701 | 618 |
| 21 | 90 | 1.03 | 701 | 78 |
| 22 | 283 | 66.77 | 60 | 2774 |
| 23 | 0 | 0.00 | 0 | 0 |
| 24 | 0 | 0.00 | 0 | 0 |
| 25 | 0 | 0.00 | 0 | 0 |
| 26 | 0 | 0.00 | 0 | 0 |
| 27 | 277 | 4.68 | 300 | 3019 |
| 28 | 149 | 4.68 | 300 | 2734 |
| Generator A output | MW | | | 279.6 |
| Generator B output | MW | | | 363.9 |
| Generator C output | MW | | | 1052.6 |
| Gas turbine heat input | MW | | | 720 |
| Reactor heat input | MW | | | 3436 |

EXAMPLE 2

A plant designed in accordance with FIG. 7 (with both steam generator and gas turbine operational, additional high temperature feedheater in service) was modeled with the results shown in Table 2.

TABLE 2

| Stream | temperature deg. C. | pressure bar. a | flow kg/s | enthalpy kJ/kg |
|---|---|---|---|---|
| 1 | 283 | 66.77 | 1898 | 2774 |
| 2 | 283 | 66.77 | 284 | 2774 |
| 3 | 283 | 66.77 | 1614 | 2774 |
| 4 | 540 | 63.43 | 284 | 3513 |
| 5 | 278 | 81.00 | 175 | 1224 |
| 6 | 154 | 81.00 | 175 | 654 |
| 7 | 134 | 25.00 | 140 | 566 |
| 8 | 24 | 25.00 | 140 | 104 |
| 9 | 24 | 0.03 | 284 | 2220 |
| 10 | 27 | 0.035 | 804 | 2334 |
| 11 | 224 | 82.74 | 1898 | 963 |
| 12 | 150 | 4.74 | 1898 | 631 |
| 13 | 150 | 4.74 | 701 | 635 |
| 14 | 27 | 82.74 | 982 | 122 |
| 15 | 24 | 0.03 | 284 | 101 |
| 16 | 273 | 4.62 | 970 | 3010 |
| 17 | 283 | 66.77 | 1509 | 2774 |
| 18 | 150 | 4.74 | 1132 | 2433 |
| 19 | 24 | 25.00 | 144 | 104 |
| 20 | 575 | 1.03 | 701 | 618 |
| 21 | 90 | 1.03 | 701 | 78 |
| 22 | 283 | 66.77 | 92 | 2774 |
| 23 | 151 | 82.74 | 190 | 641 |
| 24 | 219 | 82.74 | 1708 | 942 |
| 25 | 278 | 81.00 | 175 | 1224 |
| 26 | 154 | 90.00 | 175 | 654 |
| 27 | 0 | 0 | 0 | 0 |
| 28 | 0 | 0 | 0 | 0 |
| Generator A output | MW | | | 279.6 |
| Generator B output | MW | | | 363.5 |
| Generator C output | MW | | | 1051 |
| Gas turbine heat input | MW | | | 720 |
| Reactor heat input | MW | | | 3436 |

EXAMPLE 3

A plant designed in accordance with FIG. 7 (with only gas turbine operational) was modeled with the results shown in Table 3.

TABLE 3

| Stream | temperature deg. C. | pressure bar. a | flow kg/s | enthalpy kJ/kg |
|---|---|---|---|---|
| 5 | 280.81 | 64.99 | 94.90 | 2779.52 |
| 6 | 261.13 | 64.99 | 94.90 | 1140.26 |
| 7 | 261.13 | 64.99 | 94.90 | 1140.26 |
| 8 | 22.54 | 64.99 | 94.90 | 100.53 |
| 9 | 22.15 | 0.03 | 96.44 | 2434.76 |
| 14 | 232.63 | 2.20 | 96.44 | 2935.55 |
| 20 | 575.12 | 1.03 | 700.88 | 618.05 |
| 21 | 149.46 | 1.03 | 700.88 | 141.47 |
| 29 | 280.81 | 64.99 | 94.90 | 2779.52 |
| All other labelled streams zero | | | | |
| Generator A output | MW | | | 279.6 |
| Generator B output | MW | | | 103.5 |
| Generator C output | MW | | | 0 |
| Gas turbine heat input | MW | | | 720 |
| Reactor heat input | MW | | | 0 |

EXAMPLE 4

Figure 8:
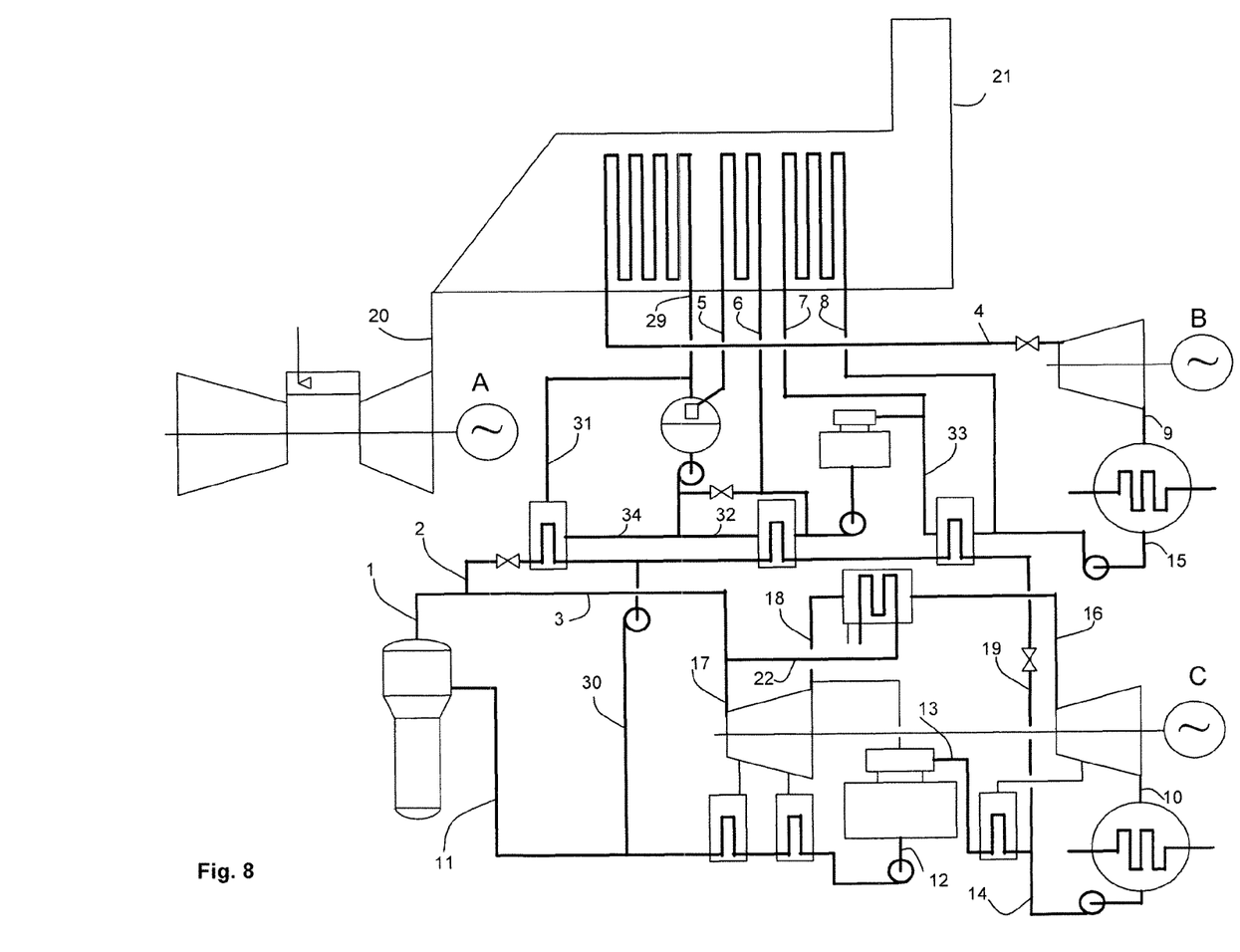
FIG. 8 shows the same flow diagram as FIG. 5 but with reference numerals relevant to Example 4 below.

A plant designed in accordance with FIG. 8 (with both gas turbine and steam generator operational) was modeled with the results shown in Table 4.

TABLE 4

| Stream | temperature deg. C. | pressure bar. a | flow kg/s | enthalpy kJ/kg |
|---|---|---|---|---|
| 1 | 283 | 66.77 | 1866 | 2774 |
| 2 | 283 | 66.77 | 285 | 2774 |
| 3 | 283 | 66.77 | 1581 | 2774 |
| 4 | 541 | 61.37 | 285 | 3516 |
| 5 | 281 | 65.00 | 97 | 1358 |
| 6 | 227 | 65.00 | 97 | 976 |
| 7 | 233 | 30.00 | 143 | 1003 |
| 8 | 149 | 4.67 | 964 | 2431 |
| 9 | 24 | 0.03 | 285 | 2226 |
| 10 | 27 | 0.03 | 805 | 2325 |
| 11 | 217 | 82.74 | 1866 | 932 |
| 12 | 149 | 4.67 | 1866 | 629 |

TABLE 4-continued

| Stream | temperature deg. C. | pressure bar. a | flow kg/s | enthalpy kJ/kg |
|---|---|---|---|---|
| 13 | 122 | 25.00 | 1147 | 514 |
| 14 | 27 | 25.00 | 976 | 114 |
| 15 | 24 | 0.03 | 285 | 101 |
| 16 | 265 | 4.55 | 964 | 2994 |
| 17 | 283 | 66.77 | 1508 | 2774 |
| 18 | 149 | 4.67 | 1126 | 2431 |
| 19 | 66 | 66.77 | 171 | 281 |
| 20 | 575 | 1.03 | 701 | 618 |
| 21 | 90 | 1.03 | 701 | 78 |
| 22 | 283 | 66.77 | 60 | 2774 |
| 29 | 281 | 64.60 | 285 | 2781 |
| 30 | 278 | 66.77 | 114 | 1229 |
| 31 | 281 | 64.60 | 278 | 2781 |
| 32 | 272 | 65.00 | 188 | 1196 |
| 33 | 219 | 30.00 | 143 | 939 |
| 34 | 275 | 64.60 | 278 | 1210 |
| Generator A output | | MW | | 279.6 |
| Generator B output | | MW | | 363.9 |
| Generator C output | | MW | | 1041 |
| Gas turbine heat input | | MW | | 720 |
| Reactor heat input | | MW | | 3436 |

EXAMPLE 5

Figure 9:
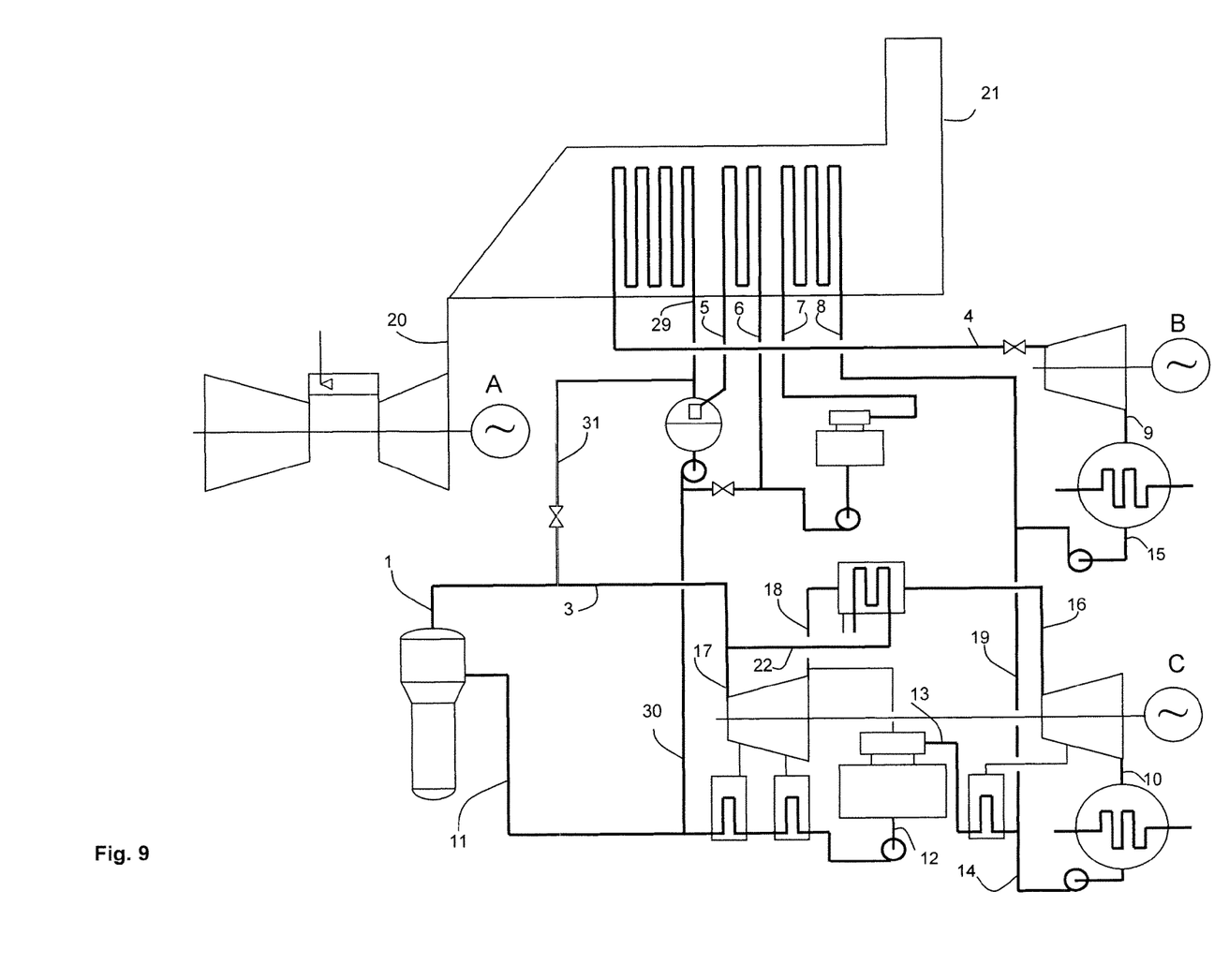
FIG. 9 shows the same flow diagram as FIG. 6 but with reference numerals relevant to Example 5 below.

A plant designed in accordance with FIG. 9 (with both gas turbine and steam generator operational) was modeled with the results shown in Table 5.

TABLE 5

| Stream | temperature deg. C. | pressure bar. a | flow kg/s | enthalpy kJ/kg |
|---|---|---|---|---|
| 1 | 283 | 66.77 | 1880 | 2774 |
| 3 | 283 | 66.77 | 1596 | 2774 |
| 4 | 533 | 63.43 | 288 | 3495 |
| 5 | 290 | 75.00 | 141 | 1293 |
| 6 | 90 | 75.00 | 141 | 381 |
| 7 | 89 | 30.00 | 141 | 376 |
| 8 | 24 | 30.00 | 141 | 105 |
| 9 | 24 | 0.03 | 288 | 2214 |
| 10 | 27 | 0.03 | 799 | 2332 |
| 11 | 220 | 66.77 | 1880 | 945 |
| 12 | 150 | 4.72 | 1742 | 631 |
| 13 | 123 | 25.00 | 1127 | 516 |
| 14 | 27 | 25.00 | 980 | 114 |
| 15 | 24 | 0.03 | 288 | 101 |
| 16 | 272 | 4.60 | 968 | 3008 |
| 17 | 78 | 0.44 | 50 | 2613 |
| 18 | 150 | 4.72 | 1130 | 2432 |
| 19 | 24 | 30.00 | 147 | 105 |
| 20 | 575 | 1.03 | 701 | 618 |
| 21 | 90 | 1.03 | 701 | 78 |
| 22 | 283 | 66.77 | 70 | 2774 |
| 29 | 283 | 66.77 | 288 | 2774 |
| 30 | 283 | 66.77 | 137 | 1251 |
| 31 | 283 | 66.77 | 284 | 2774 |
| Generator A output | | MW | | 279.6 |
| Generator B output | | MW | | 365.1 |
| Generator C output | | MW | | 1047.6 |
| Gas turbine heat input | | MW | | 720 |
| Reactor heat input | | MW | | 3436 |

The invention claimed is:

1. A process for power generation comprising: providing a steam generator, first, second and third steam turbines, a reheater, a gas turbine and at least one heat exchanger, the process having plural modes of operation,
a first mode of operation comprising:
supplying feedwater to the steam generator and generating a steam output therefrom;
supplying a first stream comprising steam from the steam generator to the first steam turbine to generate power in the first steam turbine;
recovering from the first steam turbine a recovered stream comprising steam and supplying at least a part of the recovered stream to the reheater;
supplying a second stream comprising steam from the steam generator to the heat exchanger and heating the second stream therein by supplying at least one hot exhaust gas from the gas turbine to the heat exchanger;
supplying the heated second stream to the second steam turbine to generate power therein;
supplying a third stream comprising steam from the steam generator to the reheater to heat the recovered stream from the first steam turbine;
recovering from the reheater a heated recovered stream from the first turbine; and
supplying at least part of the heated recovered stream from the first turbine to the third steam turbine to generate power therein;
a second mode of operation of the plant comprising:
supplying feedwater to the steam generator and generating a steam output therefrom;
supplying a first stream comprising steam from the steam generator to the first steam turbine to generate power in the first steam turbine;
recovering from the first steam turbine a recovered stream comprising steam and supplying at least a part of the recovered stream to the reheater;
supplying a second stream comprising steam from the steam generator to the reheater to heat the recovered stream from the first steam turbine;
recovering from the reheater a heated recovered stream from the first turbine; and
supplying at least part of the heated recovered stream from the first turbine to the third steam turbine to generate power therein; and
a third mode of operation of the plant comprising:
supplying feedwater bypassing the steam generator to the heat exchanger and heating the feedwater stream therein by supplying at least one hot exhaust gas from the gas turbine to the heat exchanger; and
recovering heated steam from the heat exchanger and supplying at least part of the recovered heated steam stream to the second steam turbine to generate power therein.

2. A process according to claim 1 wherein the heat exchanger has plural zones, including at least a first zone and a second zone.

3. A process according to claim 1 wherein the second stream comprising steam from the steam generator is supplied to the first zone of the heat exchanger.

4. A process according to claim 2 wherein in the third mode of operation of the plant the feedwater bypassing the steam generator is supplied to the second zone of the heat exchanger.

5. A process according to claim 4 wherein the feedwater is heated and at least partially evaporated in the second zone of the heat exchanger, and the process comprises:
supplying the at least partially evaporated heated feedwater stream to a separator; and
recovering from the separator a steam stream and supplying said steam stream to the first zone of the heat exchanger.

6. A process according to claim 2 wherein in the first mode of operation the process comprises:

providing feedwater to the second zone of the heat exchanger, the feedwater stream being heated in the second zone of the heat exchanger by the at least one hot exhaust gas;

recovering a heated feedwater stream from the second zone of the heat exchanger and supplying the recovered heated feedwater stream to a separator; and recovering from the separator the heated feedwater stream and supplying the recovered stream to the steam generator as at least part of the feedwater supplied thereto.

7. A process according to claim 2 wherein in said first mode of operation of the plant the second stream from the steam generator is supplied to the first zone of the heat exchanger at a temperature and pressure not substantially below that of the second stream as it is recovered from the steam generator.

8. A process according to claim 2 wherein in the first mode of operation the process comprises:

providing an auxiliary heating stream from the second zone of the heat exchanger, the auxiliary heating stream being heated in the second zone of the heat exchanger by the at least one hot exhaust gas; and supplying the auxiliary heating stream to the reheater to heat at least part of the recovered stream from the first steam turbine and/or to a feedheater to preheat at least part of the feedwater supplied to the steam generator.

9. A process according to claim 8 wherein the auxiliary heating stream comprises mixed phases.

10. A process according to claim 9 wherein at least part of a steam-containing phase of the auxiliary heating stream is separated from the auxiliary heating stream and supplied to the first zone of the heat exchanger.

11. A process according to claim 6 wherein the output steam from the second and/or third steam turbine is supplied, in whole or in part to one or more condensers.

12. A process according to claim 11 wherein at least part of the output stream(s) from the condenser(s) is supplied to a third zone of the heat exchanger and heated therein by supplying at least one hot exhaust gas from the gas turbine to the third zone of the heat exchanger.

13. A process according to claim 12 wherein the part of the output stream(s) from the condenser(s) supplied to the third zone of the heat exchanger is passed through one or more low pressure feed heaters.

14. A process according to claim 12 wherein the heat exchanger is arranged so that the at least one hot exhaust gas is passed against at least one first heat transfer surface in the first zone of the heat exchanger to heat second stream from the steam generator, so that the at least one hot exhaust gas is passed against at least one second heat transfer surface in the second zone of the heat exchanger to heat the auxiliary heating stream, and so that the at least one hot exhaust gas is passed against at least one third heat transfer surface in the third zone of the heat exchanger to heat the recovered condensate stream from the condenser, or part of it.

15. A process according to claim 14 wherein the at least one hot exhaust gas from the gas turbine is passed sequentially against the at least one first heat transfer surface, the at least one second heat transfer surface and the at least one third heat transfer surface, becoming progressively cooler from the first to the third zones of the heat exchanger.

16. A process according to claim 1 wherein in said second mode of operation of the plant, the second stream from the steam generator is supplied directly to the heat exchanger.

17. A process according to claim 1 wherein in said first or second modes of operation of the plant, the first steam turbine is a wet steam turbine and the steam in the first stream from the steam generator is supplied at or at close to a saturated condition.

18. A process according to claim 1 wherein the flow ratio of the stream supplied to the second steam turbine to the first steam stream from the steam generator is between about 0.05 to about 0.5.

19. A process according to claim 1 wherein the second steam turbine is provided with multiple zones comprising a first higher pressure zone and a second, lower pressure zone.

20. A process according to claim 19 wherein cooled and expanded steam from the first zone of the second steam turbine is at least partly supplied to the second zone of the second steam turbine and/or to the third steam turbine.

21. A process according to claim 1 wherein the reheater is constructed as a single unit, with means for supplying a heating stream from the steam generator, and means where needed for supplying an auxiliary heating stream from the heat exchanger.

22. A process according to claim 1 wherein the reheater is divided into a plurality of units.

23. A process according to claim 22 wherein the recovered stream from the first steam turbine is divided and a first recovered stream part supplied to a first reheater unit supplied with a heating stream from the steam generator and/or from a steam extraction on the first steam turbine and a second recovered stream part to a second reheater unit supplied with a heating stream from the heat exchanger.

24. A process according to claim 23 wherein the recovered stream flow is switchable so that the flow through the second reheater unit can be stopped or altered in response to interruptions or fluctuations in the gas turbine output.

25. A process according to claim 1 wherein in the first mode of operation at least part of the feedwater supplied to the steam generator via a high temperature feedheater.

26. A process according to claim 25 wherein the feedwater flow is switchable so that the flow through the feedheater can be stopped or altered in response to interruptions or fluctuations in the gas turbine output.

27. A process according to claim 1 wherein the energy flow of the at least one hot exhaust gas stream supplied from the gas turbine is from about 0.05 to about 0.3 of the net enthalpy of materials recovered from the steam generator.

28. A power generation plant configured to operate the process of claim 1.

* * * * *